April 3, 1951     L. J. ELLIS     2,547,114
MACHINIST'S GAUGE

Filed Feb. 4, 1948     2 Sheets—Sheet 1

Leo J. Ellis
INVENTOR.

BY *Clarence A. O'Brien*
*and Harvey B. Jackson*
Attorneys

April 3, 1951　　　　　L. J. ELLIS　　　　　2,547,114
MACHINIST'S GAUGE

Filed Feb. 4, 1948　　　　　　　　　　　　　2 Sheets-Sheet 2

Leo J. Ellis
INVENTOR.

Patented Apr. 3, 1951

2,547,114

UNITED STATES PATENT OFFICE 2,547,114

MACHINIST'S GAUGE

Leo J. Ellis, Medford, Mass.

Application February 4, 1948, Serial No. 6,239

4 Claims. (Cl. 33—162)

The present invention relates to new and useful improvements in machinist's gauges designed for accurately measuring heights on planers, lathes and similar machines and more particularly to means for easily and quickly obtaining a micrometer adjustment of the gauge block.

A further object of the invention is to provide a slide carried by the trianguluar shaped frame or base of the gauge and on which the slide is adjustable and providing a gauge block carried by the slide and provided with a micrometer adjustment therebetween, the adjustment of the slide on the frame providing an approximate adjustment for the gauge block while the micrometer adjustment of the gauge block on the slide provides a fine adjustment therefor.

A further object of the invention is to provide a gauge of this character of simple and practical construction, which is efficient and reliable in use, relatively inexpensive to manufacture and otherwise well adapted for the purposes for which the same is intended.

Figure 1:
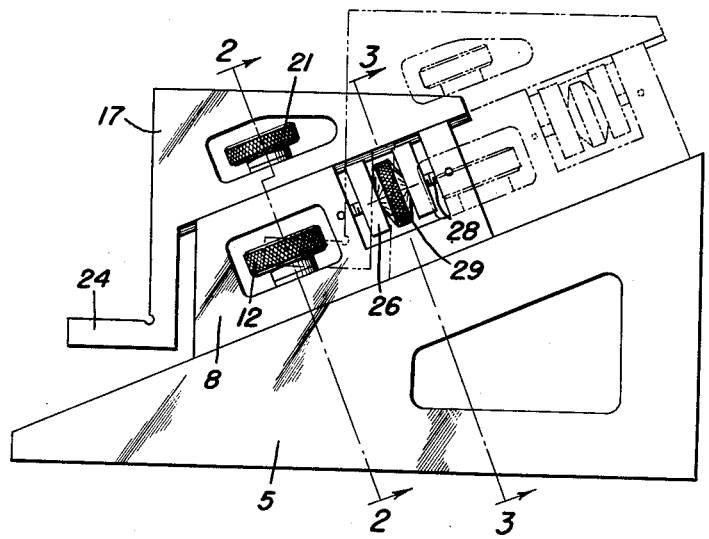
Figure 2:
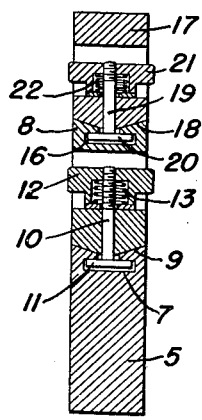
Figure 3:
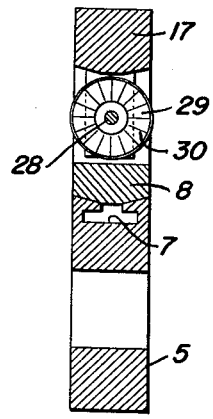
Figure 4:
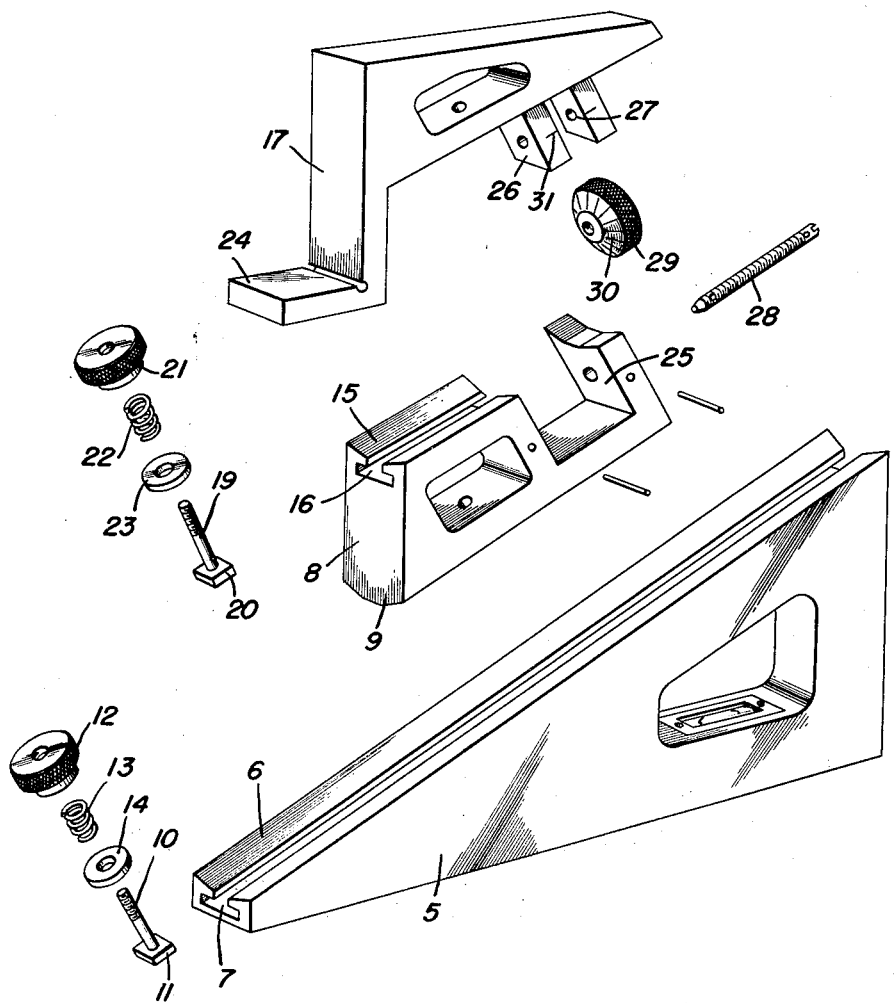

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figures 2 and 3 are transverse sectional views taken respectively on the lines 2—2 and 3—3 of Figure 1, and;

Figure 4 is a group perspective view of the several elements of the invention disassembled from each other.

Referring now to the drawings in detail wherein for the purpose of illustration I have disclosed a preferred embodiment of the invention the numeral 5 designates a triangular shaped frame or base with a V-shaped upper edge 6 formed with a T-slot 7.

A slide 8 formed with a substantially V bottom 9 is slidably mounted on the upper edge of frame 5 and is secured in adjusted position thereon by a bolt 10 carried by the slide and having a head 11 at its lower end working in slot 7 and secured in adjusted position in the slot by a knurled nut 12 threaded on the bolt. A coil spring 13 is held under tension between the nut 12 and a washer 14 to lock the bolt to the nut.

The slide 8 has parallel upper and lower edges and its upper edge is likewise formed with a substantially V-shaped groove 15 terminating in a T slot 16.

A substantially triangular shaped gauge block 17 is positioned oppositely with respect to the triangular frame 5 and is formed with a substantially V-shaped lower edge 18 slidably seated in the V groove 15 of slide 8. The gauge block 17 is secured in adjusted position on the slide by a bolt 19 carried by the gauge block and having a head 20 at its lower end engaged in T slot 16, the gauge block being secured in adjusted position by a knurled nut 21 and is likewise provided with a coil spring 22 and washer 23 for locking the nut to the bolt. A horizontal step 24 is carried at the front end of the block 17.

The upper edge of slide 8 is notched or recessed as shown at 25 to freely receive a pair of bearing blocks 26 extending downwardly in spaced parallel relation to each other from the underside of gauge block 17. The bearing blocks 26 are formed with aligned openings 27 for receiving a screw 28 carried in the recess 25 of slide 8 for slidable movement of the bearings longitudinally on the screw. A micrometer adjusting nut 29 is threaded on the screw between the bearings 26 and is provided with graduations 30 at each end of the nut coacting with the zero setting 31 carried at the outer edge of the bearing blocks 26.

In the operation of the device an approximate adjustment of the gauge block 17 is obtained by moving the slide 8 longitudinally on the inclined edge of frame 5 and a micrometer adjustment of the gauge block 17 is then obtained through the manipulation of nut 29 to slide the gauge block on the upper edge of slide 8.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A machinist's gauge comprising a triangular base frame adapted for positioning edgewise on work, an elongated slide adjustably supported longitudinally on the frame, an elongated gauge block slidably supported longitudinally on the slide, a screw carried longitudinally by the slide, an adjusting nut threaded on the screw, and means carried by the gauge block acted on by the nut to provide a micrometer adjustment for the block in accordance with the movement of the nut independently of the adjustment of the slide.

2. A machinist's gauge comprising a triangular base frame adapted for positioning edgewise on work, an elongated slide adjustably supported longitudinally on the frame, an elongated gauge block slidably supported longitudinally on the slide, a screw carried longitudinally by the slide, an adjusting nut threaded on the screw, and means carried by the gauge block acted on by the nut to provide a micrometer adjustment for the block in accordance with the movement of the nut independently of the adjustment of the slide, said means comprising a pair of spaced parallel bearing blocks carried by the gauge block and positioned at opposite sides of the nut.

3. A machinist's gauge comprising a substantially triangular shaped base frame adapted for positioning edgewise on work to provide a lower straight edge and an inclined upper edge, an elongated slide including a body having parallel upper and lower edges slidably supported longitudinally on the inclined upper edge of the frame, an elongated gauge block having an inclined lower edge slidably supported longitudinally on the upper edge of the slide, the upper and lower edges of the gauge block and frame respectively, being parallel, means carried by the slide and engaging the base frame to hold and lock the slide thereon in quick slidably adjusted position to approximately adjust the gauge block on the base frame, and micrometer adjusting means connecting the gauge block to the slide to provide a fine adjustment for the gauge block independently of the quick adjustment of the slide.

4. A machinist's gauge comprising a substantially triangular shaped base frame adapted for positioning edgewise on work, an elongated slide adjustably supported longitudinally on the upper edge of the frame, an elongated gauge block slidably supported longitudinally on the slide, and micrometer adjusting means between the gauge block and the slide to provide a quick adjustment for the gauge block independently of the adjustment of the slide.

LEO J. ELLIS.

REFERENCES CITED

The following references are of record in the file of this patent:

UNITED STATES PATENTS

| Number | Name | Date |
|---|---|---|
| 875,050 | Conlon | Dec. 31, 1907 |
| 1,351,528 | Martin | Aug. 31, 1920 |
| 2,242,116 | Donaway | May 13, 1941 |
| 2,351,105 | Casali | June 13, 1944 |
| 2,397,492 | Koning | Apr. 2, 1946 |